(12) United States Patent
Gaurav et al.

(10) Patent No.: US 12,321,419 B2
(45) Date of Patent: Jun. 3, 2025

(54) SELECTION AND USE OF BLUEPRINTS IN DEVICE MANAGEMENT

(71) Applicant: Dell Products L.P., Round Rock, TX (US)

(72) Inventors: Natasha Gaurav, Hopkinton, MA (US); Maxim Balin, Gan-Yavne (IL); Parminder Singh Sethi, Punjab (IN); Akanksha Goel, Faridabad (IN); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/495,181

(22) Filed: Oct. 26, 2023

(65) Prior Publication Data
US 2025/0139203 A1 May 1, 2025

(51) Int. Cl.
*G06F 18/232* (2023.01)
*G06F 18/2415* (2023.01)

(52) U.S. Cl.
CPC ........ *G06F 18/232* (2023.01); *G06F 18/2415* (2023.01)

(58) Field of Classification Search
None
See application file for complete search history.

(56) References Cited

U.S. PATENT DOCUMENTS

| | | | | |
|---|---|---|---|---|
| 2004/0199484 A1* | 10/2004 | Smith | ............... | G06F 16/9027 706/46 |
| 2010/0192170 A1* | 7/2010 | Raleigh | ............... | H04L 12/1407 725/1 |
| 2013/0107706 A1* | 5/2013 | Raleigh | ............... | H04W 28/24 370/230 |
| 2015/0365351 A1* | 12/2015 | Suit | ............... | G06F 8/60 709/226 |
| 2017/0005864 A1* | 1/2017 | Liu | ............... | H04L 41/5054 |
| 2018/0302494 A1* | 10/2018 | Jain | ............... | G06F 11/3438 |
| 2019/0312800 A1* | 10/2019 | Schibler | ............... | H04L 41/0869 |
| 2019/0370139 A1* | 12/2019 | Vichare | ............... | G06F 9/44505 |
| 2022/0303352 A1* | 9/2022 | Herzog | ............... | G06N 20/00 |
| 2022/0398183 A1* | 12/2022 | Kerlin | ............... | G06F 11/3495 |
| 2023/0297484 A1* | 9/2023 | Kabra | ............... | G06F 21/31 726/21 |

* cited by examiner

*Primary Examiner* — Irene Baker
(74) *Attorney, Agent, or Firm* — WOMBLE BOND DICKINSON (US) LLP (57) ABSTRACT

Methods and systems for managing operation of endpoint devices are disclosed. To manage the operation of endpoint devices, a management framework may be used. The management framework may allow users to define desired outcomes for operation of endpoint devices. Once defined, the management framework may supplement the desired outcomes with additional context. The desired outcomes and additional context may be used to determine how to configure the endpoint devices. For example, applications for deployment to the endpoint devices may be identified and confirmed with the requestors via use of the management framework.

20 Claims, 5 Drawing Sheets

SELECTION AND USE OF BLUEPRINTS IN DEVICE MANAGEMENT

FIELD

Embodiments disclosed herein relate generally to device management. More particularly, embodiments disclosed herein relate to management of endpoint devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the operation of devices. To manage the operation of the devices, a management framework may be used. The management framework may allow requestors to define desired outcomes in plain text.

Once defined, the automation framework may identify applications, configuration, and/or other aspects of the operation of an endpoint device that when implemented are likely to meet the desired outcome. The automation framework may do so, in part, using additional context. The additional context may include information regarding an organization of which the requestor is a member. For example, the context may include certain preference of that organization.

The context may be used to classify the request. Once classified, the classification may be used to identify a decision tree for use is identifying the applications, configurations, etc. The decision tree may provide different options for the applications, configuration, etc. based on probabilities of use based on historical information (e.g., examples of previous uses of the applications, configurations, etc. for similar desired outcomes).

Information regarding the applications and probabilities, for example, may be provided to a requestor and the requestor may select one of the applications for use. The selection may be used to define a blueprint which may be used to update the operation of a device.

The selection may also be used, for example, to update the management framework. For example, the classification model used to classify the request and the decision trained may be based on training data. The selection may be added to the training data and may be used to update the classification model and/or the decision tree.

By doing so, embodiments disclosed herein may improve the likely of desired computer implemented services being provided to requestors while also reducing the cognitive burden on the users for selection of applications and/or other aspects of operation of devices that may contribute to the manner in which the computer implemented services are provided.

Thus, embodiments disclosed herein may address, among other technical problems, the technical problem of device configuration to provide desired services. By supplementing user supplied description of desired outcomes with additional context, the resulting recommendations may be more likely to effectuate the desired outcomes of the requestors of the outcomes.

In an embodiment, a method for managing operation of an endpoint device is provided. The method may include obtaining, from a requestor, a desired outcome for the endpoint device; classifying the requestor using a classification model to obtain a classification for the requestor; identifying, using the classification, a decision tree from a decision tree repository, the decision tree being trained to rank applications for the desired outcome; obtaining, using the desired outcome and the decision tree, a ranking of applications; obtaining, using the ranking of the applications, a blueprint; and updating, using the blueprint, operation of the endpoint device to obtain an updated endpoint device to provide desired computer implemented services.

The decision tree repository may include decision trees corresponding to classifications, and the classification model being trained to classify requestors into at least one of the classifications.

The classification model may be a clustering model.

The clustering model may be based on training data that associates an entity of which the requestor is a member with a cluster, the cluster being the classification.

The decision tree may be trained to ingest, as input, at least a portion of natural language from the desired outcome.

The method may also include processing the desired outcome using natural language processing to obtain at least two input features for the decision tree.

Obtaining the ranking of the applications may include traversing the decision tree based on the at least two input features to reach at least one leaf node, the leaf node being associated with at least one of the applications.

The method may also include presenting, to the requestor, at least a portion of the applications based on the ranking; and obtaining, responsive to the presented at least a portion of the applications, user input.

The method may further include identifying, based on the user input, an application of the applications. Obtaining the blueprint may include adding at least one instruction to the blueprint to instantiate an instance of the application on the endpoint device when the operation of the endpoint device is updated using the blueprint.

The blueprint may also be obtained based on available resources of the endpoint device and performance metrics of the endpoint device.

The blueprint may include instructions that when executed by the endpoint device cause the endpoint device to perform at least one action from a list of actions consisting of: installing the application; removing an existing application; modifying a software configuration of the endpoint device, and operation of the application being dependent on the configuration; and modifying operation of a hardware component of the endpoint device, and operation of the application being dependent on the operation of the hardware component.

The method may also include updating, using the user input, the decision tree to obtain an updated decision tree, the updated decision tree comprising at least one difference in decisional logic from decision logic of the decision tree.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1:
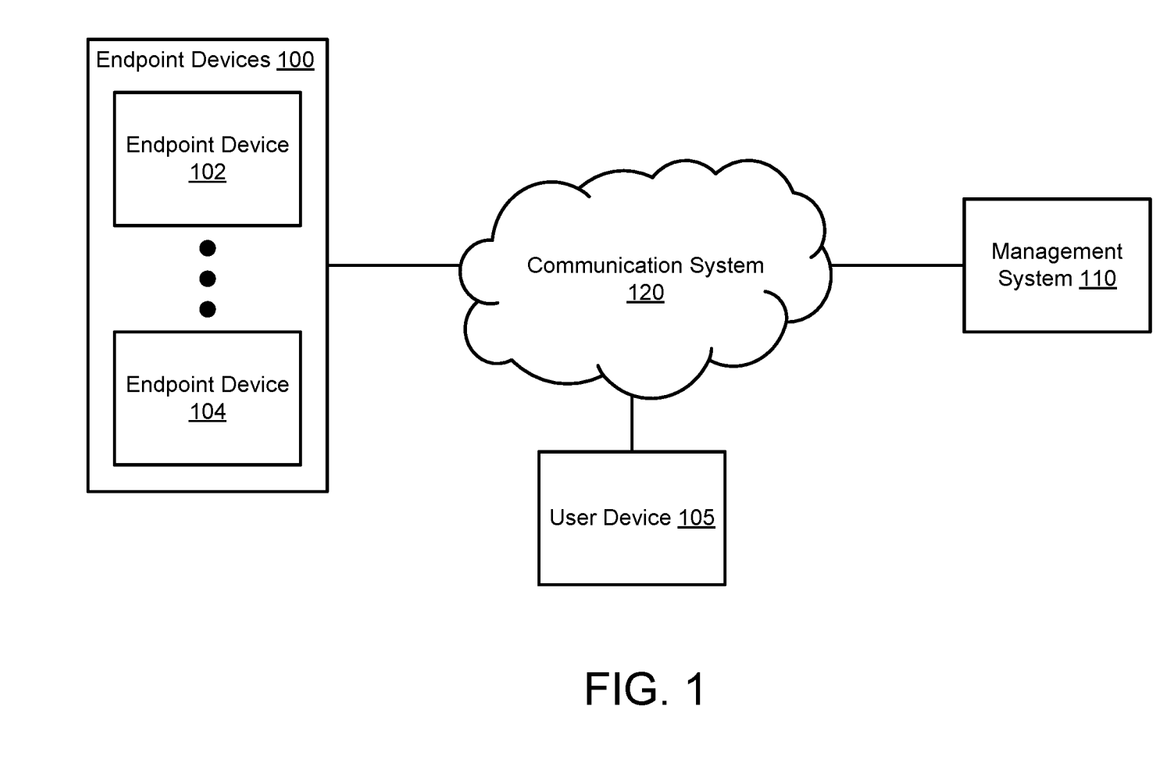
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system include endpoint devices 100. Each endpoint device (e.g., 102, 104) may provide similar and/or different computer implemented services, and may provide the computer implemented services independently and/or in cooperation with other endpoint devices.

To provide the services, any of endpoint devices 100 may need to be in a predetermined configuration. For example, to provide database services, an endpoint device may need to host certain software (e.g., database software), may need to include certain hardware and/or software configurations, may need to not host software that may conflict with the software necessary to provide the computer implemented services, etc.

In general, embodiments disclosed herein may provide methods, systems, and/or managing endpoint devices to provide desired computer implemented services. Manage the endpoint devices, the system of FIG. 1 may implement a management framework. The management framework may obtain desired outcomes from users of endpoint devices 100, translate the desired outcomes into blueprints usable to update the operation of endpoint devices 100, and update the operation of endpoint devices 100 using the blueprints.

To enable broad use of the management framework, the management framework may allow users of endpoint devices 100 to define the desired outcome using natural language. Because the users of endpoint devices 100 may have limited knowledge regarding the software, configurations, and/or other aspects of operation of endpoint devices 100 necessary to reach the desired outcomes, the user may specify the desired outcomes in terms of their desired uses. Thus, rather than declaratively defining how the endpoint devices are to operate, the user may define desired outcomes for the operation of the endpoint devices.

Once the desired outcome is defined by a user (e.g., in plain text), the system of FIG. 1 may obtain additional context to identify applications, configurations, and/or other aspects of operation of endpoint devices to effectuate the desired outcomes. The additional context may be an organization to which the user belongs. The organization to which the user belongs (and/or information regarding the user) may be used to identify how other endpoint devices have been configured to effectuate similar goals for other organizations.

To do so, the request to provide a desired outcome may be classified based on the organization. Once classified, the classification may be used to identify at least one decision tree from multiple decision trees corresponding to the classifications.

The decision tree may take, from the plain text desired outcome, various input features and provide one or more recommended applications, configurations, etc. for operation of an endpoint device to effectuate the outcome. The decision tree may also take, as input, some or all of the context. The decision tree may also take, as input, organizationally defined criteria such as weighting information (e.g., for the input), performance and/or scalability requirements, budget and/or cost considerations, and/or other types of information usable by an organization to align configuration decision for endpoint devices with decision goals.

Once the input is ingested, the decision tree may output a ranking of applications, configurations, and/or other types of information (e.g., in aggregate, "recommendations") usable to define a blueprint. The recommendations may be reviewed by a user for acceptance (e.g., may select based on the recommendations) by providing corresponding user input.

Once obtained, the user input may be used to obtain a blueprint. The blueprint may be obtained by reading an existing blueprint from storage, by generating a blueprint, and/or via other methods. The blueprint may then be used to update operation of an endpoint device. For example, the endpoint device may host an automation framework that may ingest the blueprint and update operation of the endpoint device accordingly. Consequently, the updated operation of the endpoint device may provide desired computer implemented services.

The user input may also be used, for example, to update a classification model used to classify the request and/or update the decision tree and/or other decision trees. For example, the classification model and decision trees may be trained models. The user input and desired outcome may be used to define a new relationship for training data usable to train the classification model and/or the decision trees. Thus, the management framework may be updated over time.

To provide the above noted functionality, the system of FIG. 1 may include endpoint devices 100, communication system 120, and management system 110. Each of these components is discussed below.

Endpoint devices 100 may provide computer implemented services. To provide the computer implemented services, an endpoint device may (i) host an automation framework usable to update operation of the endpoint device using blueprints, and (ii) use the automation framework to update operation of the endpoint device as new blueprints from management system 110 are provided to the endpoint device. The automation engine may also manage drift of the endpoint device overtime from a blueprint. For example, the blueprint may be treated as a desired, declared state, and the automation engine may monitor the endpoint device for deviations from the declared stated. If deviations are identified, the automation engine may perform various actions to conform the actual state of the endpoint device to the declared state.

User device 105 may be a device used by a user of endpoint devices 100 to define desired outcomes. To do so, user device 105 may enable a user to use a portal or other interface presented by management system 110. The interface may allow the user to provide user input to define a desired outcome for an endpoint device. For example, the interface may allow the user to provide a plain text description of the desired outcome.

Management system 110 may manage the operation of endpoint devices 100. To do so, management system 110 may (i) present interfaces to user device 105 to enable the user to define a desired outcome for an endpoint device, (ii) provide, to the user via the interface (e.g., a graphical user interface or other type of interface), recommendations regarding a declared state for the endpoint device (e.g., recommendations for applications, configurations, etc.) using the management framework, (iii) obtain user input, (iv) use the user input and recommendations to obtain blueprints, (v) update operation of the endpoint device using the blueprints, and/or (vi) update the management framework based on the user input and recommendations.

Figure 2A:
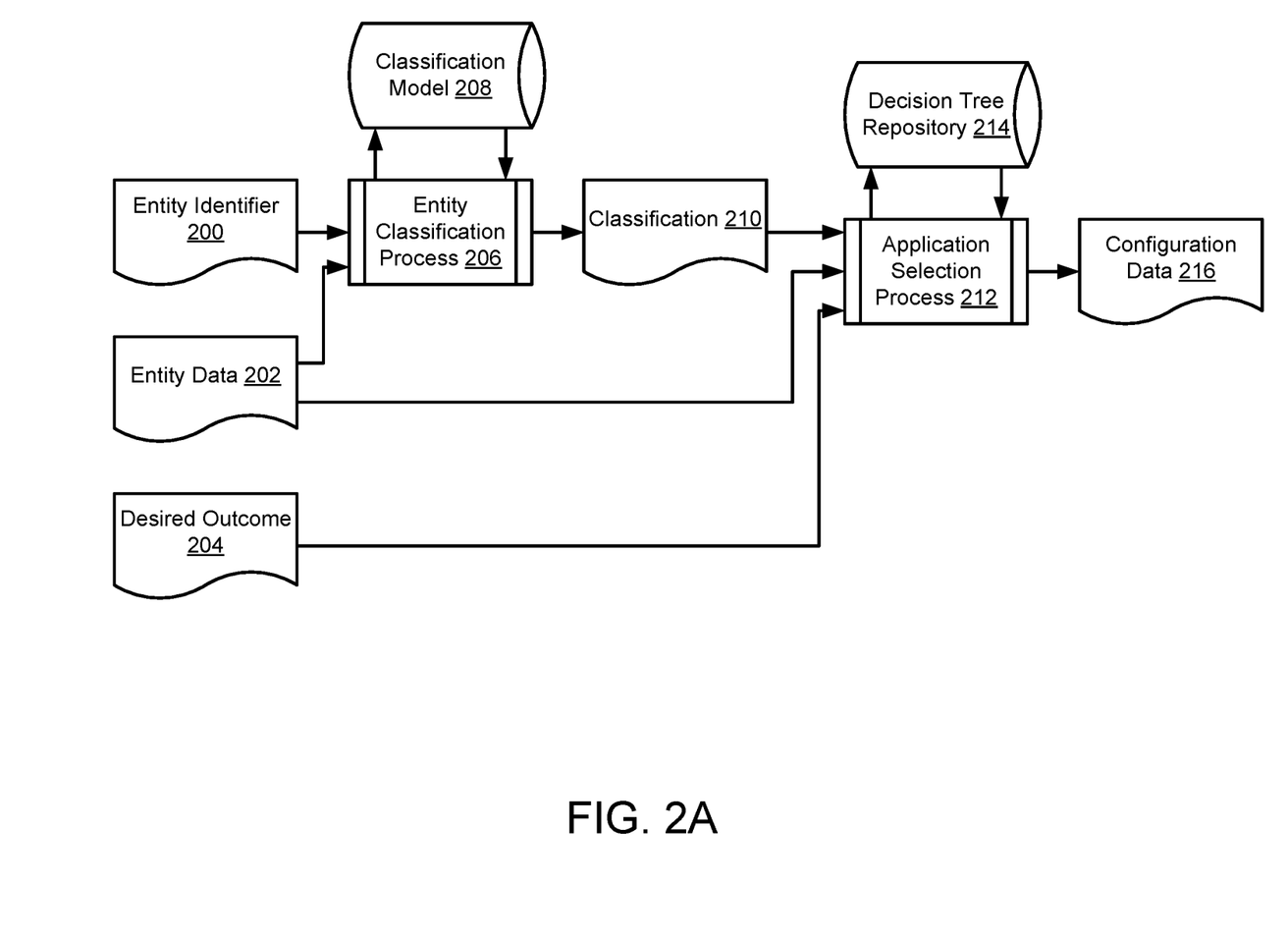
FIGS. 2A-2B show data flow diagrams in accordance with an embodiment.
Figure 2B:
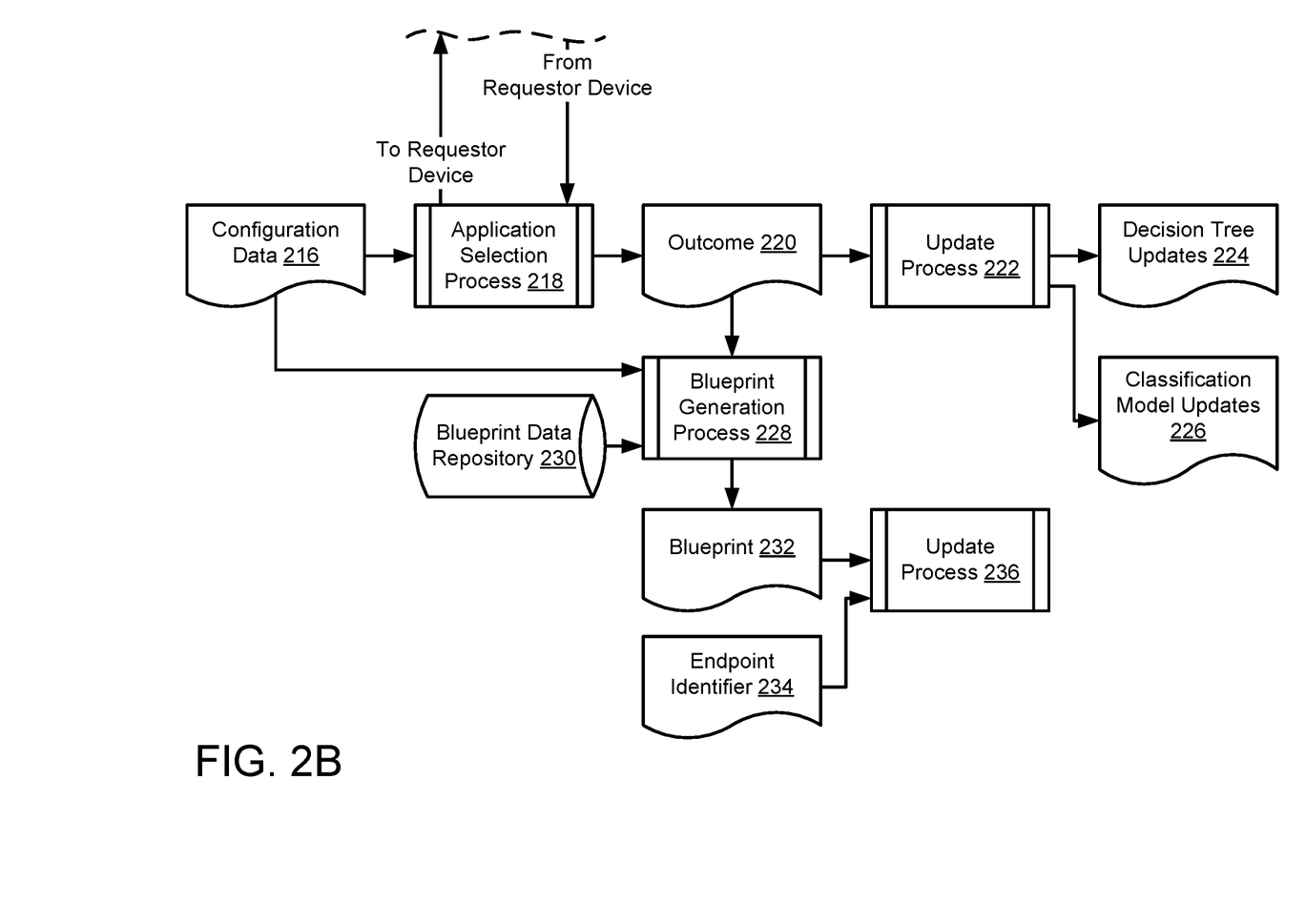
Figure 3:
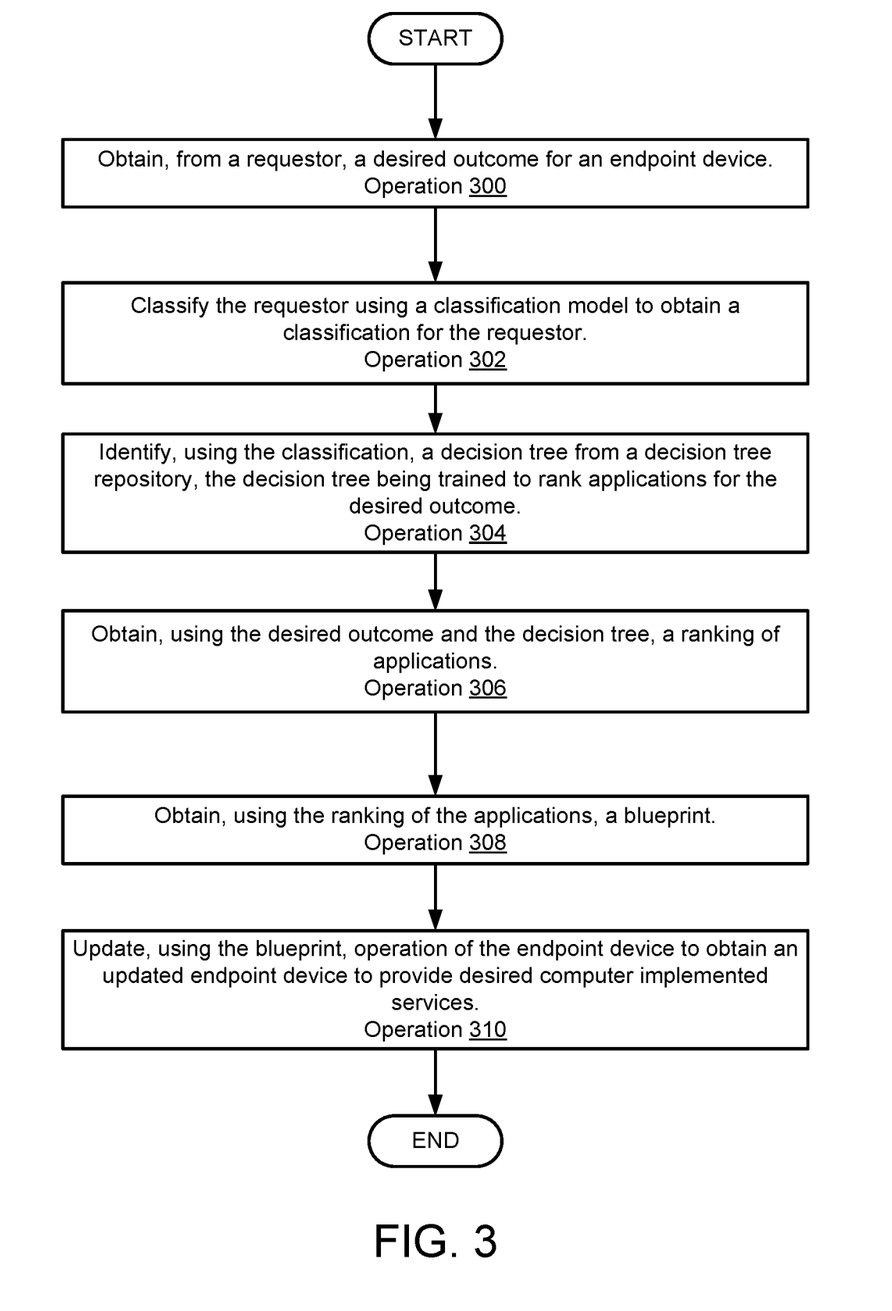
FIG. 3 shows a flow diagram illustrating method in accordance with an embodiment.

When providing their functionality, any of (and/or components thereof) endpoint devices 100, user device 105, and/or management system 110 may perform all, or a portion, of the data flows and methods illustrated in FIGS. 2A-3.

Any of (and/or components thereof) endpoint devices 100, user device, and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 202, etc.) is used to represent data structures, a second set of shapes (e.g., 206, 212, etc.) is used to represent processes performed using and/or that generate data, and a third set of shapes (e.g., 208, 214, etc.) is used to represent large scale data structures such as databases.

Turning to FIG. 2A, a first data flow diagram in accordance with an embodiment is shown. The first data flow diagram may illustrate data used in and data processing performed in servicing requests for updating operation of endpoint devices.

To update operation of an endpoint device, a user may provide user input to define desired outcome 204 for an endpoint device (e.g., identified by endpoint identifier 234, shown in FIG. 2B. Desired outcome 204 may be a plain text description of an outcome for operation of an endpoint device (and/or multiple endpoint devices). For example, the user may specify an outcome of "reducing error in quality of chips by 2%" and/or "minimizing cost for reducing the error" in plain text via an interface presented by a management system.

Based on the requested desired outcome, an entity identifier (e.g., 200) and entity data (e.g., 202) for the entity identified by the entity data may be obtained. For example, the requestor may be a member of an organization identified by the entity identifier which may be obtained by being provided by the requestor or looked up using a data structure that associates different requestors with different entities.

The entity data may be provided by the entity (e.g., an organization may define the entity data) and/or may be read from a database (e.g., if previously provided by the entity). The entity data may include, for example, (i) requirements and/or preferences of the organization (and/or the requestor specifically), (ii) performance and/or scalability requirements, (iii) budget and/or cost considerations, (vi) weighting factors for the other attributes of the entity data, and/or other contextual information usable to identify applications, configuration, etc. that are more likely to be desired by the requestor and/or the requestor's organization.

Once obtained, entity identifier 200 and/or entity data 202 may be ingested by entity classification process 206. During entity classification process 206, a classification (e.g., 210) for the request (e.g., desired outcome 204) may be obtained. The classification may be obtained using classification model 208. Classification model 208 may be a trained inference model usable to classify the request into a classification of multiple classifications. For example, the inference model may ingest entity identifier 200 and/or entity data 202 and output classification 210.

Classification model 208 may be a trained clustering model. The trained clustering model may cluster the organization of which the requestor is a member into a cluster. The clusters may be obtained using training data. The training data may be analyzed using any clustering algorithm such as self-supervised learning.

The training data may include any type and quantity of information regarding different organization such as, for example, organization preferences, past interactions with the organization, demographic data for the organization, or any other relevant organization-specific attributes. Thus, when information regarding an organization of which the requestor is a member is obtained, classification model 208 may be used to identify a cluster of which the organization is a member based on the corresponding information regarding the organization (e.g., may be included in entity data 202).

Once classification 210 is obtained, all or a portion of classification 210, entity data 202, and desired outcome 204 (e.g., in aggregate "decision tree ingest data") may be ingested by application selection process 212. During application selection process 212, recommended configuration data 216 may be obtained based on the decision tree ingest data. To obtain configuration data 216, classification 210 may be used to identify a decision tree from decision tree repository 214.

Decision tree repository 214 may include any number of decision trees. The decision trees may be associated with different classifications. Each of the decision trees may be trained using training data from the members of the cluster corresponding to a classification.

For example, to obtain a decision tree, training data for the decision tree may be obtained and used to train the decision tree using a training algorithm. The training data used to obtain a given decision tree may only include data regarding members of a corresponding cluster defined by classification model 208.

The training data for the members may include, for example, (i) a list of applications, configuration, etc. currently used by each member, including their functionalities, dependencies, and performance characteristics; (ii) industry-specific standards, regulations, or compliance requirements faced by the organizations, (iii) information regarding each members' existing internet technology infrastructure, including hardware, network capabilities, operating systems, databases, and cloud services; (iv) information regarding the data sources available to each member and the desired integration capabilities for the members, (v) information regarding preferences, roles, and responsibilities of users of each member, (vi) information regarding user requirements, such as user interfaces, workflows, collaboration needs, and access controls; (vii) information regarding expected performance levels, scalability requirements, and anticipated user loads; (viii) corresponding desired outcomes of the members (e.g., with (ii)-(vii) being features corresponding to the labels (i)), and/or other information usable to associate different applications, configuration, etc. with corresponding desired outcomes.

Using the training data, a decision tree may be obtained using a training algorithm. Any training algorithm (e.g., fully automated, semi-automated, etc.) to train a decision tree may be used. The resulting trained decision tree may include any number of burst nodes that each correspond to a feature in the training data. Paths leading from each burst node may include corresponding decision leads.

Thus, through training different decision trees using different sets of training data, decision trees customized to different types of organization may be obtained.

To obtain configuration data 216, the identified decision tree may be traversed using desired outcome 204 and entity data 202 (e.g., which may be used as input to the identified decision tree). If weights are included in entity data 202, each of the input may be weighted using a corresponding weight (e.g., to emphasis or deemphasis contribution of the feature to configuration data 216).

During the traversal, any number of burst nodes may be traversed until a leaf node is reached. A corresponding feature of the input may be used to decide which path to take following each burst node. The features may be obtained from desired outcome and entity data 202. To obtain input features from desired outcome 204, the plain text may be parsed or otherwise interpreted using a model, such as a large language model, natural language processing, and/or other algorithm. For example, the algorithm may map the plain text to input parameters for the decision tree. The resulting input data may be used to identify the paths to take following the burst nodes.

Once the decision tree traversal is complete, a leaf node may be identified (e.g., at the end of the traversed path. The leaf node may be associated with type and quantity of configuration data for a data processing system.

The resulting configuration data 216 may specify recommendations for various applications, configurations, etc. Features of each recommendation may also be provided. The features may justify the recommendation. For example, the features may specify information regarding an application that explains why it is useful in various cases. The features may be added by a subject matter expert, and/or may be associated with corresponding leaf nodes of the decision tree.

In some cases, the leaf nodes may be associated with multiple versions of the application data. For example, within the training data, different organizations may have elected to use different applications, configurations, etc. under similar circumstances. To account for these differences, weights associated with the different versions of the application data may be used to indicate the relative prevalence of use of the particular application data.

For example, if the training data includes 100 instances of similar features with an outcome label (e.g., different versions of the configuration data) distribution of 60 instances of a first version of the application data, 30 instances of a second version of the application data, and 10 instances of the third application data, then weights of 0.6, 0.3, and 0.1 may be associated with the different versions of the application data (e.g., thereby representing the relative probability of each outcome.

Configuration data 216 may include these instances along with the weights to provide users with different options for configuring endpoint devices to achieve the desired outcome.

Turning to FIG. 2B, a continuation of the data flow diagram of FIG. 2A is shown.

Continuing with the discussion, once configuration data 216 is obtained, application selection process 218 may be performed.

During application selection process 218, information regarding configuration data 216 may be presented to a requestor. The requestor may review the information and select one or more of the features of configuration data for use. For example, the user may review the alternative suggested applications along with the corresponding weights to select one of the applications for use. The selections by the requestor may be aggregated as outcome 220.

Once obtained, outcome 220 may be used to update the decision trees and/or classification model. For example, update process 222 may be performed. During update process, outcome 220 and the corresponding information regarding the requestor/requestor's organization/desired outcome may be added to training data used to train the classification model and/or decision tree. The training data may be used to retrain or otherwise update the model/tree to obtain decision tree updates 224 and classification model updates 226.

Outcome 220 may also be ingested by blueprint generation process 228. During blueprint generation process 228, a blueprint may be obtained. The blueprint may be based on the selections made by the user as specified by outcome 220.

To blueprint may be obtained by (i) generating a new blueprint, and/or (ii) updating an existing blueprint. The resulting blueprint may include instructions that when performed cause an endpoint device to enter a declared state as specified by outcome 220. For example, outcome 220 may specify the applications to be hosted by an endpoint device, configurations to be made to the endpoint device, etc. The blueprint may specify the actions to be performed to reach the declared state.

The resulting blueprint 232 may then be ingested by update process 236. During update process 236, an automation framework may use the blueprint to update operation of an endpoint device identified by endpoint identifier 234. The endpoint identifier may be indicated by the initial request (e.g., the desired outcome 204).

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows shown in FIGS. 2A-2B, the operation of an endpoint device may be updated based on a desired outcome of operation of the endpoint device. Consequently, a user of the endpoint device may not need to be aware of how to configure the endpoint device to provide the desired outcome.

As discussed above, the components of FIG. 1 may perform various methods to manage the operation of endpoint devices. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing data of an endpoint device in accordance with an embodiment is shown. The method may be performed by any of endpoint devices 100, user device 105, management system 110, and/or other components of the system shown in FIG. 1.

At operation 300, a desired outcome for an endpoint device may be obtained from a requestor. The desired outcome may be obtained by presenting an interface to the requestor, obtaining user input via the interface, and generating the desired outcome based on the user input. The desired outcome may be plain text from the requestor that defines the desired outcome.

At operation 302, the requestor is classified used a classification model to obtain a classification for the requestor. The requestor may be classified by identifying membership of the requestor in an organization, and ingesting an identity of the organization and/or information regarding the organization into a classification model. The classification model may be a clustering model. The cluster model may identify similarities and use the similarities to decide on a cluster of which the requestor's organization is a member. The classification may be an identifier of the cluster and/or a label for the cluster.

At operation 304, a decision tree is identified. The decision tree may be identified by using the classification to discriminate the decision tree from other decision trees in a repository. The decision trees of the repository may be associated with corresponding classifications.

At operation 306, a ranking of applications is obtained using the desired outcome and the decision tree. The ranking may be obtained by ingesting the desired outcome into the decision tree. The decision tree may be traversed to identify a leaf node. The leaf node may specify, for example, various versions of configuration data that each specify applications, configurations, etc. with corresponding weights. The weights may define the ranking of the applications from the version of the configuration data.

The decision tree may also ingest some or all of the information regarding the organization. For example, the desired outcome as well as the information regarding the organization may be used as input to the decision tree, which may be used to select paths following burst nodes in the decision tree.

At operation 308, a blueprint is obtained using the ranking of the applications. The blueprint may be obtained by (i) presenting the ranking of the applications to a user, (ii) obtaining user input, (iii) identifying one of the applications based on the user input, and (iv) obtaining the blueprint based on the identified application. The blueprint may be identified by (i) reading the blueprint from storage if it already exists, (ii) obtaining blueprint from another device by requesting the blueprint, (iii) generating the blueprint, and/or via other methods.

At operation 310, operation of the endpoint device is updated to obtain an updated endpoint device to provide desired computer implemented services. The operation of the blueprint may be updated by initiating configuration of the endpoint device using the blueprint. Once configured, the updated endpoint device may provide the computer implemented services. The updating may be initiated by providing the blueprint to an automation framework hosted by the endpoint device, and/or other entities (e.g., an orchestrator or other management entity that manages the endpoint device).

The method may end following operation 310.

Thus, using the method illustrated in FIG. 3, desired computer implemented services may be provided by an endpoint device by updating its operation. The operation may be updated by users that lack knowledge regarding how the endpoint device may need to operate to meet a desired outcome. Thus, embodiments disclosed herein may reduce a cognitive burden on users of the endpoint device.

Figure 4:
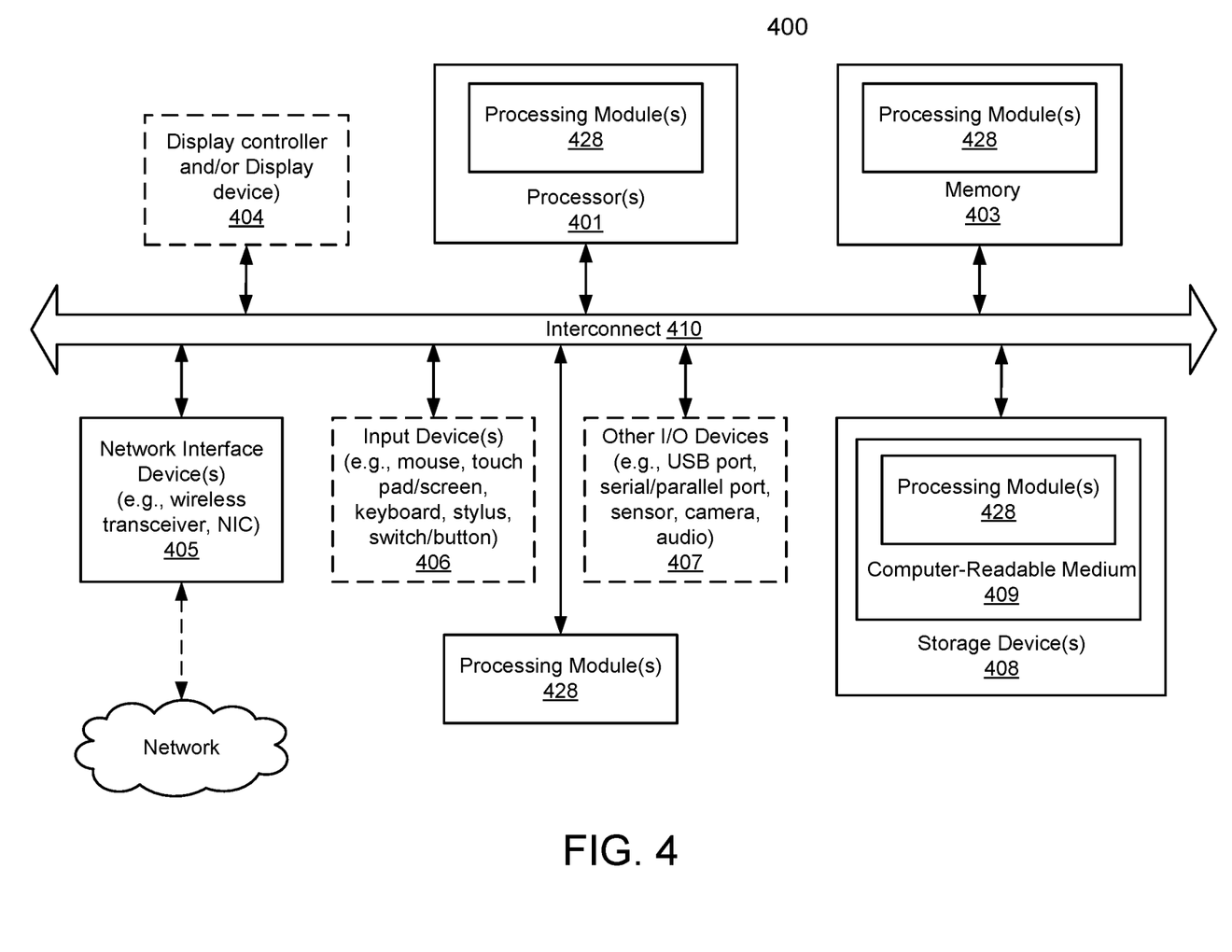
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device, the method comprising:
   obtaining, from a requestor, a desired outcome for the endpoint device, the desired outcome being obtained from the requestor in a natural language format expressing a desired use of the requestor for the endpoint device without explicit indication of how one or more software or hardware configurations of the endpoint device should be modified to provide the desired outcome;

classifying the requestor using a classification model to obtain a classification for the requestor, the requestor being a member of an entity associated with the endpoint device;

identifying, by the classification model using the classification obtained for the requestor and from among a plurality of clusters, a cluster to which the entity is a member;

further identifying, by the classification model and using the classification obtained for the requestor, a trained decision tree among one or more trained decision trees stored in a decision tree repository, the trained decision tree being trained to rank applications for the desired outcome and being trained on data associated with the cluster;

obtaining, using the desired outcome and the trained decision tree, a ranking of the applications;

obtaining, using the ranking of the applications, a blueprint; and updating, using the blueprint, the one or more software or hardware configurations of the endpoint device to obtain an updated endpoint device that provides one or more computer implemented services associated with the desired outcome of the requestor.

2. The method of claim 1, wherein the classification is one of a plurality of classifications and the requestor is one of a plurality of requestors, and the classification model being trained to classify each of the plurality of requestors into a respective one of the plurality of classifications.

3. The method of claim 2, wherein the classification model is a clustering model.

4. The method of claim 3, wherein the clustering model is configured based on training data that associates the entity with the cluster, the training data being identical to the data on which the trained decision tree is trained.

5. The method of claim 1, further comprising:
presenting, to the requestor, at least a portion of the applications based on the ranking; and
obtaining, responsive to the presented at least a portion of the applications, user input.

6. The method of claim 5, further comprising:
identifying, based on the user input, an application of the applications,
wherein obtaining the blueprint comprises adding at least one instruction to the blueprint to instantiate an instance of the application on the endpoint device when the operation of the endpoint device is updated using the blueprint.

7. The method of claim 6, wherein the blueprint is also obtained based on available resources of the endpoint device and performance metrics of the endpoint device.

8. The method of claim 7, wherein the blueprint comprises instructions that when executed by the endpoint device cause the endpoint device to perform at least one action from a list of actions consisting of:
installing the application;
removing an existing application;
modifying a software configuration, among the one or more software or hardware configurations, of the endpoint device, and an operation of the application is dependent on the software configuration; and modifying an operation of a hardware component, among the one or more software or hardware configurations, of the endpoint device, and the operation of the application being dependent on the operation of the hardware component.

9. The method of claim 5, further comprising:
updating, using the user input, the trained decision tree to obtain a user input updated trained decision tree, the user input updated trained decision tree comprising at least one difference in decisional logic from decision logic appearing in the trained decision tree before the updating.

10. A non-transitory machine-readable medium having instructions stored therein, which when executed by at least one processor, cause a system to perform system first operations for managing operation of an endpoint device, the system first operations comprising:

obtaining, from a requestor, a desired outcome for the endpoint device, the desired outcome being obtained from the requestor in a natural language format expressing a desired use of the requestor for the endpoint device without explicit indication of how one or more software or hardware configurations of the endpoint device should be modified to provide the desired outcome;

classifying the requestor using a classification model to obtain a classification for the requestor, the requestor being a member of an entity associated with the endpoint device;

identifying, by the classification model using the classification obtained for the requestor and from among a plurality of clusters, a cluster to which the entity is a member;

further identifying, by the classification model and using the classification obtained for the requestor, a trained decision tree among one or more trained decision trees stored in a decision tree repository, the trained decision tree being trained to rank applications for the desired outcome and being trained on data associated with the cluster;

obtaining, using the desired outcome and the trained decision tree, a ranking of the applications;

obtaining, using the ranking of the applications, a blueprint; and updating, using the blueprint, the one or more software or hardware configurations of the endpoint device to obtain an updated endpoint device that provides one or more computer implemented services associated with the desired outcome of the requestor.

11. The non-transitory machine-readable medium of claim 10, wherein the classification is one of a plurality of classifications and the requestor is one of a plurality of requestors, and the classification model being trained to classify each of the plurality of requestors into a respective one of the plurality of classifications.

12. The non-transitory machine-readable medium of claim 11, wherein the classification model is a clustering model.

13. The non-transitory machine-readable medium of claim 12, wherein the clustering model is configured based on training data that associates the entity with the cluster, the training data being identical to the data on which the trained decision tree is trained.

14. A management system, comprising:
a processor; and
a memory coupled to the processor to store instructions, which when executed by the processor, cause the management system to perform operations for managing operation of an endpoint device, the operations comprising:

obtaining, from a requestor, a desired outcome for the endpoint device, the desired outcome being obtained from the requestor in a natural language format expressing a desired use of the requestor for the endpoint device without explicit indication of how one or more software or hardware configurations of the endpoint device should be modified to provide the desired outcome;

classifying the requestor using a classification model to obtain a classification for the requestor, the requestor being a member of an entity associated with the endpoint device;

identifying, by the classification model using the classification obtained for the requestor and from among a plurality of clusters, a cluster to which the entity is a member;

further identifying, by the classification model and using the classification obtained for the requestor, a trained decision tree among one or more trained decision trees stored in a decision tree repository, the trained decision tree being trained to rank applications for the desired outcome and being trained on data associated with the cluster;

obtaining, using the desired outcome and the trained decision tree, a ranking of the applications;

obtaining, using the ranking of the applications, a blueprint; and updating, using the blueprint, the one or more software or hardware configurations of the endpoint device to obtain an updated endpoint device that provides one or more computer implemented services associated with the desired outcome of the requestor.

15. The management system of claim 14, wherein the classification is one of a plurality of classifications and the requestor is one of a plurality of requestors, and the classification model being trained to classify each of the plurality of requestors into a respective one of the plurality of classifications.

16. The management system of claim 15, wherein the classification model is a clustering model.

17. The management system of claim 16, wherein the clustering model is configured based on training data that associates the entity with the cluster, the training data being identical to the data on which the trained decision tree is trained.

18. The method of claim 1, further comprising and prior to obtaining the desired outcome from the requestor:

obtaining the one or more trained decision trees and storing the one or more trained decision trees in the decision tree repository.

19. The non-transitory machine-readable medium of claim 10, wherein the operations further comprise:

presenting, to the requestor, at least a portion of the applications based on the ranking; and obtaining, responsive to the presented at least a portion of the applications, user input.

20. The management system of claim 14, wherein the operations further comprise:

presenting, to the requestor, at least a portion of the applications based on the ranking; and obtaining, responsive to the presented at least a portion of the applications, user input.

* * * * *